(12) United States Patent
Brideglall

(10) Patent No.: US 7,561,547 B2
(45) Date of Patent: *Jul. 14, 2009

(54) AUTOMATIC AND SEAMLESS VERTICAL ROAMING BETWEEN WIRELESS LOCAL AREA NETWORK (WLAN) AND WIRELESS WIDE AREA NETWORK (WWAN) WHILE MAINTAINING AN ACTIVE VOICE OR STREAMING DATA CONNECTION: SYSTEMS, METHODS AND PROGRAM PRODUCTS

(75) Inventor: Raj Brideglall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/356,474

(22) Filed: Feb. 17, 2006

(65) Prior Publication Data

US 2007/0091845 A1    Apr. 26, 2007

Related U.S. Application Data

(63) Continuation of application No. 10/014,448, filed on Dec. 14, 2001, now Pat. No. 7,039,027.

(60) Provisional application No. 60/258,669, filed on Dec. 28, 2000, provisional application No. 60/277,020, filed on Mar. 19, 2001.

(51) Int. Cl.
*H04W 4/00* (2006.01)
*H04L 12/28* (2006.01)
*H04L 12/56* (2006.01)

(52) U.S. Cl. ........................ 370/329; 370/331; 370/401

(58) Field of Classification Search ................. 370/329, 370/332, 328, 331, 335, 342, 401, 349, 352, 370/356, 210, 341, 389, 254; 455/423, 424, 455/455, 436, 63, 452, 450, 435, 442, 465, 455/437; 709/204, 227, 232, 239, 250
See application file for complete search history.

(56) References Cited

U.S. PATENT DOCUMENTS 5,682,379 A    10/1997    Mahany et al. .............. 370/311

(Continued)

FOREIGN PATENT DOCUMENTS

| EP | 0 701 337 A2 | 3/1996 |
| EP | 0 701 337 A3 | 3/1996 |
| WO | WO 00/28762 | 5/2000 |
| WO | WO 00/72536 A1 | 11/2000 |

OTHER PUBLICATIONS

"Handoff in Hybrid Mobile Data Networks"—Kaveh Pahlavan, et al. IEEE Apr. 2000.

(Continued)

*Primary Examiner*—Wing F Chan
*Assistant Examiner*—Prenell P Jones

(57) ABSTRACT

A Mobile Station (MS) is able to vertically roam in either direction between two different networks, i.e., WWAN and WLAN. The MS is equipped with a dual mode Radio for WWAN and WLAN transmissions. The WLAN Radio is linked to a WLAN Enterprise Gateway Controller (EGC) via a first air link and the WWAN Radio is linked to a WWAN Base Transceiver Station (BTS) via a second air link. An outgoing VoIP call from the WLAN Radio to a remote party on the WWAN will transition or seamlessly switch over to a WWAN connection when the MS detects packet error rates, frequent scale back or consistent signal degradation.

33 Claims, 13 Drawing Sheets

U.S. PATENT DOCUMENTS

| | | | | |
|---|---|---|---|---|
| 5,790,527 | A | 8/1998 | Janky et al. | 370/330 |
| 5,943,333 | A | 8/1999 | Whinnett et al. | 370/345 |
| 6,075,985 | A | 6/2000 | Kao | 455/422 |
| 6,157,635 | A | 12/2000 | Wang et al. | 370/352 |
| 6,760,748 | B1 * | 7/2004 | Hakim | 709/204 |
| 7,039,027 | B2 * | 5/2006 | Bridgelall | 370/329 |
| 2003/0065784 | A1 * | 4/2003 | Herrod | 709/227 |

OTHER PUBLICATIONS

N. Blefari-Melazzi et al., *Dimensioning of play-out buffers for real-time services in a B-ISDN*, Computer Communications, vol. 21, No. 11 p. 980-994, (Aug. 10, 1998).

International Search Report (Jun. 18, 2002).

"Wireless and Mobile Architectures" by Y. Lin et al., published by John Wiley & Sons, Inc., NY, Chapters 9 and Chapter 18 (2001).

"*IEEE 802.11 Handbook—A Designer's Companion*" by B. O'Hara and A. Petrek, published by the Standards Information Network, IEEE Press, NY, NY Chapter 2. ISBN 0-7381-1855-9 (1999).

"*An Introduction to GSM*" by S. M. Reddel et. al., Artech House, Inc., Norwood, MA, published (ISBN 0-89006-785-6), Chapters 3 and 5 (1995).

"*Wireless LANs—Implementing Interoperable Network*" by Jay Geier, published by MacMillian Technical Publishing, Chapters 4 and 5, ISBN 1-57870-081-7 (1999).

* cited by examiner

GSM-LOGICAL CHANNEL TYPES

| TRAFFIC 302 | | DEDICATED 324 | ASSOCIATED 304 | | BROADCAST 320 | | COMMON 322 |
|---|---|---|---|---|---|---|---|
| SPEECH | DATA | SDCCH/4 | FACCH/TF | SACCH/TF | SCH | | PCH |
| TCH/F 306 — TCH/F9.6 308 | | 338 | 342 | | | | 332 |
| — TCH/F4.8 310 | | | | SACCH/C4 | FCCH | | AGCH |
| — TCH/F2.4 312 | | | | 348 | | | 334 |
| TCH/H 314 — TCH/H4.8 316 | | SDCCH/8 | FACCH/H | SACCH/TH | BCCH | | RACH |
| — TCH/H2.4 318 | | 346 | 344 | SACCH/C8 | 330 | 328 | 336 |

22.8 kb/s (top group) / 11.4 kb/s (bottom group)

BI-DIRECTIONAL | UNI-DIRECTIONAL

300

TCH: TRAFFIC—SPEECH OR DATA
SDCCH: STANDALONE DEDICATED—INTERMEDIATE CHANNEL FOR AUTHENTICATION AND CALL SETUP.
FACCH: FAST ACCESS CONTROL—URGENT COMMANDS TO INITIATE HAND-OVER—SAME INFORMATION AS SDCCH.
SACCH: SLOW ACCESS CONTROL—LINK MAINTENANCE (POWER,TIMING ADVANCE, ETC.)
FCCH: FREQUENCY CORRECTION—MU CLOCK AND FREQUENCY SYNCHRONIZATION—NOT FOR EQUALIZATION.
SCH: SYNCHRONIZATION—MU FRAME AND SLOT TIME SYNCHRONIZATION.
BCCH: BROADCAST CONTROL—NETWORK CONFIGURATION PARAMETERS FOR ACCESS.
PCH: PAGING—ALERT FOR INCOMING CALL.
AGCH: ACCESS GRANT—BS PROVIDES PARAMETERS FOR ACCESS TO DEDICATED CHANNEL FOR CALL SETUP.
RACH: RANDOM ACCESS—MU POSTS REQUESTS TO BS.

*FIG. 3*

AUTOMATIC AND SEAMLESS VERTICAL ROAMING BETWEEN WIRELESS LOCAL AREA NETWORK (WLAN) AND WIRELESS WIDE AREA NETWORK (WWAN) WHILE MAINTAINING AN ACTIVE VOICE OR STREAMING DATA CONNECTION: SYSTEMS, METHODS AND PROGRAM PRODUCTS

PRIORITY CLAIM

Applicant claims priority for the present application based on: (1) Provisional Application entitled "Technical Considerations for WWAN/WLAN Integration", Ser. No. 60/258,669, filed Dec. 28, 2000; (2) Provisional Application entitled "Designing Dual-Network (WWAN/WLAN) Wireless Terminals" Ser. No. 60/277,020, filed Mar. 19, 2001, both applications assigned to the same assignee as that of the present invention, and fully incorporated herein by reference.

CROSS REFERENCE TO RELATED APPLICATIONS

This application is a continuation of application Ser. No. 10/014,448, filed Dec. 14, 2001 now U.S. Pat. No. 7,039,027.

BACKGROUND OF THE INVENTION

1. Field of the Invention

This invention relates to communication systems, methods and program products. More particularly, this invention relates to automatic and seamless vertical roaming between a wireless local area network (WLAN) and a wireless wide area network (WWAN) while maintaining an active voice or streaming data connection: systems, methods and program products.

2. Description of Prior Art

Wireless personal digital assistants (WPDA) and "smart" cellular telephones are the most popular devices known to provide "mobile Internet" access for the mass consumer market. At this point, no one has yet developed a technology that combines WLAN based Voice over Internet Protocol (VoIP) and streaming DATA with WWAN circuit switched telephony such that the transition between WWAN and WLAN voice connections occur seamlessly and automatically. With such development, WLAN based voice telephony will provide a benefit to carriers that manage both infrastructures to seamlessly and automatically move traffic from overloaded WWAN networks over to higher bandwidth WLAN networks when the subscriber moves. Carriers and network equipment manufacturers that produce both WWAN and WWLAN infrastructure products can now have a mechanism for a successful business and billing model around both WWAN and higher speed WLAN based mobile Internet access. In addition, spillover enterprise and consumer level markets will expand with a domino effect as mobile professionals seek to bring the benefits of their high speed Internet and IP based voice access into their homes and small offices.

Prior art related to automatic voice or data transfer between different wireless networks includes:

U.S. Pat. No. 5,682,379 discloses a transceiver apparatus for creating a wireless personal local area network between a computer terminal and one or more peripheral devices. A separate transceiver is connected to the computer terminal and to each peripheral device. The transceivers can be connected to the terminal or peripheral device either internally or externally. A low power Radio is used to communicate information between the computer terminal and peripheral devices. Different transceivers can be used for modifying the carrier frequency and power of the local area network. The microprocessor is located inside each transceiver and controls the information flow of the transceiver including the communication protocol which allows each device to know if other devices are communicating, which devices are being communicated to, and selectively address the peripheral devices. An Idle Sense communication protocol is used for information transfer between the computer terminal and the peripheral devices, increasing efficiency in power management and compensating for transmission collisions.

(2) U.S. Pat. No. 5,790,527 discloses a trunked Radio communications system, apparatus and methods for transparently updating existing frequency division multiple access (FDMA) communications facilities to accommodate time division multiple access (TDMA) communications. TDMA channels are added to existing FDMA sites on an individual basis to increase spectral efficiency and capacity while still being compatible with existing FDMA equipment and protocols. For example, the existing FDMA control channel and protocols are used by dual mode sites and dual mode Radios. A dual mode Radio transceiver selectively participates in trunked Radio communications in either an FDMA mode or in a TDMA mode. Each dual mode Radio includes a memory for storing a mode identifier identifying each channel as an FDMA or a TDMA working channel. When a channel assignment is made, the dual mode Radio determines from that channel mode identifier stored in memory whether to operate in the FDMA or TDMA mode for that particular communication. Moreover, dual mode Radios expedite synchronization to a TDMA working channel (time slot) using a timing relationship established between the FDMA control channel and the TDMA working channels. In the context of multiple site, trunked Radio communications, the present invention provides for interoperability between sites and Radios which have TDMA communications capabilities and sites and Radios which have only FDMA capabilities.

(3) U.S. Pat. No. 6,075,985 discloses a fixed wireless access system includes a base station for bi-directional communication with a switching center, a private branch exchange (PBX) for bi-directional communication with a plurality of user stations, and a wireless trunk interface (WTI). The WTI communicates with the base station over a bi-directional wireless air link and with the PBX over a bi-directional trunk line. Since a wireless link is established between a dual Radio unit (DRU) at the base station and a transceiver at the WTI, the slots normally allocated to the directory number of the called and calling parties in the current air interface, must be used to identify the transceiver involved in the exchange of information. Therefore, the DN of the called station behind the PBX is transmitted to the WTI using other fields of the air interface, and presented to PBX in a format acceptable for establishing a correct connection (DID service). Similarly, the DN of the calling station behind the PBX, is transmitted to base station and presented to switching center using a format acceptable for use by the switching center (AIOD service).

None of the prior art discloses automatic and seamless vertical roaming between a WLAN and a WWAN by detecting second network availability for switching over while maintaining an active voice or data connection on the first network so that the existing connection is maintained and the transition is continuous.

SUMMARY OF THE INVENTION

A Mobile Station (MS) is able to vertically roam between two different networks, i.e. WWAN and WLAN where the WWAN includes the General Packet Radio System (GPRS) using the infrastructure of the existing Global System of Mobile communications (GSM). GSM and GPRS serve as the example in this description but the method is equally applicable to other WWAN network types. Since all WWAN networks that carry circuit switched voice calls through the public service telephone network (PSTN) must also support a subset of some basic PSTN supplementary services, GSM supplementary services include Explicit Call Transfer (ECT) and Caller Identification (CI). The MS is equipped with a dual mode Radio for WWAN and WLAN transmissions. The WLAN Radio is linked to a WLAN Enterprise Gateway Controller (EGC) via a first air link and the WWAN Radio is linked to a WWAN Base Transceiver Station (BTS) via a second air link. The EGC is connected to a Mobile Switching Center (MSC) which is in turn connected to the BTS and the nature of these connections can be of any standard wired or wireless configuration presently incorporated as prior art. An outgoing VoIP call from the WLAN Radio to a remote party on the WLAN will transition or seamlessly switch over to the WWAN connection when the MS detects packet error rates, frequent scale back or consistent signal degradation. Upon such conditions, the WLAN Radio requests the EGC to request an Explicit Call Transfer or a conference call via the MSC to the MS integrated WWAN Radio portion which automatically accepts the call based on referenced information stored in the user's subscriber identification module (SIM). Once the WWAN Radio is confirmed connected to the remote party on the WWAN, the WLAN Radio drops the WLAN connection. An incoming call between the MS and a remote user via the WWAN will transition to the WLAN Radio when the MS enters WLAN coverage. The MS issues a conference call request or ECT to the WLAN. After user verification by the WLAN Radio and the EGC signals acceptance of the call, the WWAN Radio connection is dropped and the call is now established between the WLAN Radio and the remote party on the WWAN. WLAN signaling and WLAN VoIP traffic are synchronized to vacant GSM time slots. WLAN voice traffic will occur during vacant GSM signaling time slots. WLAN signaling will occur during vacant GSM traffic slots. WLAN VoIP data traffic segments are collected and compressed by a digital signal processor approximately every 10 msec. and includes digital companding. Packets arriving for the mobile dual mode Radio are buffered at an Access Point (AP) since the mobile remains time synchronized to free WWAN slots. Once the mobile is able to access the WLAN network, it will issue a "PS Poll" command to retrieve buffered frames from the AP. A processor receives raw WLAN data frames from a base band processor and extracts the voice samples from the data frames. The samples are placed in a "jitter buffer" before conversion to an audio stream. The "jitter buffer" equalizes the random delays associated with packet arrival times over a packet-based network. The MS passively scans for a WLAN network by listening for regularly scheduled beacons sent out by an AP access point or another mobile basic service set identification. Alternatively, the mobile can actively scan for a network by sending out "Probe Request" commands.

DESCRIPTION OF THE DRAWINGS

The invention will be further understood from the following description of a preferred embodiment taken in conjunction with an appended drawing, in which:

FIG. 3 is a table of logical channel types for traffic and control in the prior art network of FIG. 2;

DESCRIPTION OF PREFERRED EMBODIMENT

Figure 1:
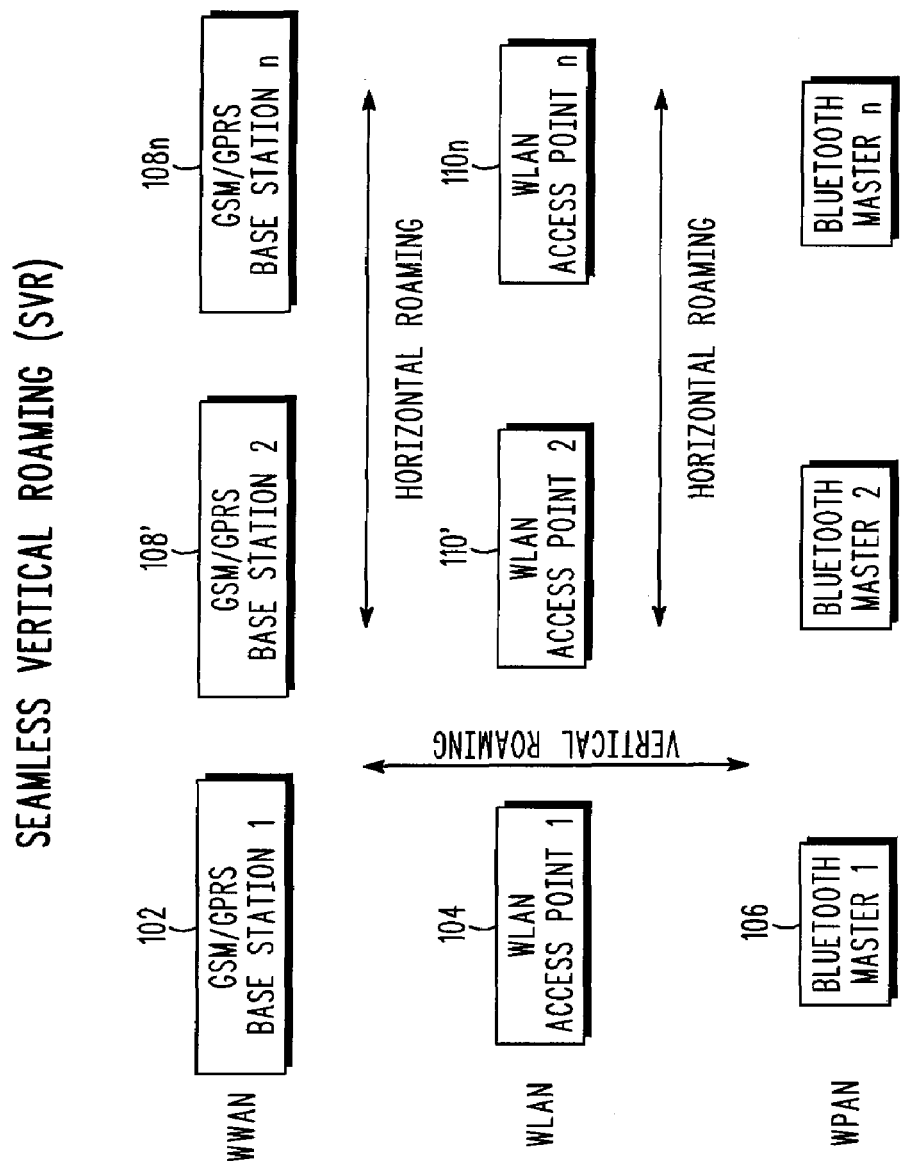
FIG. 1 is a representation of Seamless Vertical Roaming (SVR) among a WWAN base station; a WWLAN access point and a Wireless Personal Assistant Network (WAN) master transceiver, the WWAN and WPAN network providing horizontal roaming between networks.

FIG. 1 describes Seamless Vertical Roaming (SVR) 100 as the automatic transfer of a logical connection between a Wireless Wide Area Network (WAN) 102; Wireless Local Area Network (WLAN) 104 and Wireless Personal Assistant (WPAN) 106 for integrated voice/data communication. The WPAN wireless network known as Blue Tooth was developed by industry working groups including the Home RF Working Group (HRFWG) and the Blue Tooth (SIG). The transfer of a logical connection between the networks 102, 104 and 106 is seamless to a user maintaining voice communication or a data transfer while a Radio sub-system automatically switches between the two substantially different networks, as will be described hereinafter. SVR also includes enabling an application/user to switch or roam to a specific network when more than one network is available based on the physical knowledge of the physical location of a specific network, as described hereinafter.

When more than one network is available, either push based location services or a pull based location service may be desired. For example, even though WWAN coverage with good signal strength may be available in a mall, WLAN network access with equally good or slightly worse signal quality may still be preferred because of the higher speed access and additional in-commerce space services within the mall. A roaming algorithm takes into account that the user is in the mall (or university campus) and switches over to the WLAN (even though the signal quality is not necessarily any better).

SVR does not impact horizontal roaming between wirelessly linked WWAN base station $108^1$ ... $108^n$. Likewise, SVR does not impact horizontal roaming between wirelessly linked WLAN access points $110^1$ ... $110^n$. Blue Tooth is not equipped to handle horizontal roaming. A description of Blue Tooth technology is described in the text "Wireless and Mobile Architectures" by Y. Lin et al., published by John Wiley & Sons, Inc., NY, 2001, ppgs. 488 and 490.

Wireless wide area networks (WWAN) 102 wirelessly connects users and devices over an extensive geographic area. A number of wireless systems exist including, Cellular Digital Packet (CDPD), Global System Mobile (GSM) and General Packet Radio Service (GPRS) and others. For convenience, the WWAN of the present invention will be described in terms of GSM/GPRS. The text *"Wireless and Mobile Network Architectures"* by Y Lin et al, published by John Wiley & Sons, New York, N.Y. (2001) provides an overview of both GSM and GPRS systems in Chapter 9 and Chapter 18 and is fully incorporated herein by reference. The IEEE 802.11 protocol for WLAN is described in the text, *"IEEE 802.11 Handbook—A Designer's Companion"* by B. O'Hara and A. Petrek, published by the Standards Information Network, IEEE Press, NY, N.Y. Chapter 2, and is fully incorporated herein by reference.

The wireless local area network (WLAN) 104 is a flexible data communication system implemented as an extension to or as an alternative for a wired local network. Using Radio Frequencies (RF) technology, wireless LANs transmit and receive data over the air, minimizing the need for wired connection. Wireless LANs combine data connectivity with user mobility. In a typical wireless LAN configuration, a transmitter/receiver (transceiver) access point connects to the wired network to a fixed location using standard cabling. At a minimum, the access point receives, buffers and transmits data between the wireless LAN and the wired network infrastructure. A single access point can support a small group of users and can function within a range of less than 100 to 700 feet. The access point (or the antenna attached to the access point) usually mounted high but may be mounted essentially anywhere is practical as long as desired Radio coverage is obtained.

End-user access the wireless local area networks through wireless LAN adapters, which are implemented as PC cards in notebooks or PALM top computers, as PALMs and desktop computers are integrated within hand-held computers. Wireless LAN adapters provide an interface between the client Network Operating System (NOS) and the airways via an antenna. The nature of the wireless connection is transparent to the NOS.

Figure 2:
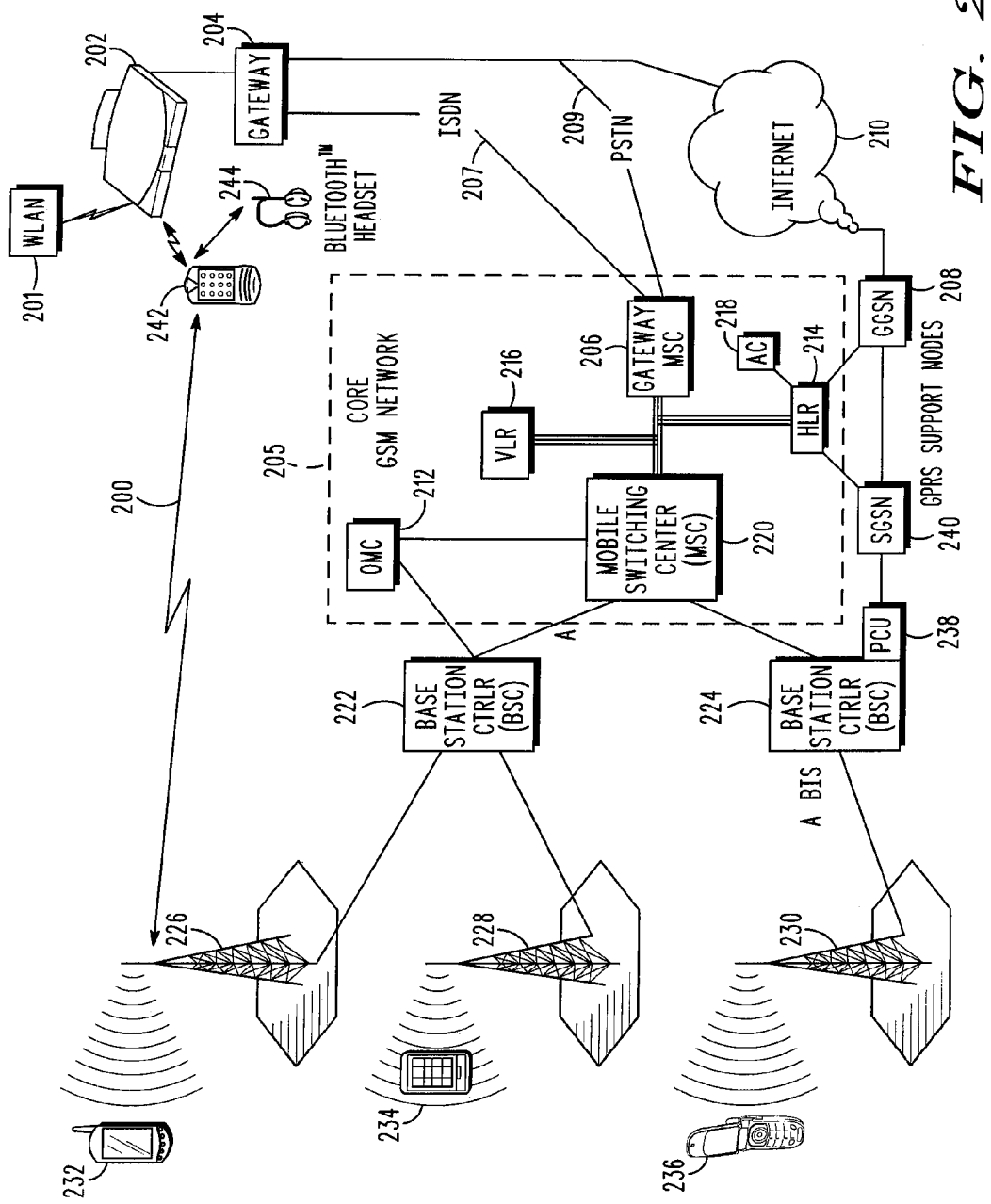
FIG. 2 is a representation of a prior art GSM/GPRS network linked to users via wireless links and to access points by servicing mobile devices, the GSM/GPRS network being coupled to external networks including ISDN, PSTN, the Internet, etc.

FIG. 2 discloses a WWAN (GSM/GPRS) network 200 serving mobile devices. An access point 202 is wirelessly linked to WLANs 201 in buildings and public spaces (not shown). A gateway 204 connects the access point to a GSM/GPRS network 205 via a mobile switching center gateway 206 over public networks, for example, ISDN 207, PSTN 209, etc. and the Internet 210. The network 205 includes an Operation and Maintenance Center (OMC) 212 responsible for coordinating the traffic and loading on the network. A Home Location Register (HLR) 214, a Visitor Location Registry (VLR) 216 and Authentication Center (AC) 218 store information about the users so as to facilitate roaming, billing and network security. A Mobile Switching Center 220 linked to the gateway 206 is wired to base stations 222 and 224, which are in turn wired to antennas 226, 228, 230, each serving multiple mobile devices, for example, various Wireless Personal Data Assistance 232, 234 and smart telephones 236 popular devices known to provide "mobile internet access" for the mass consumer market. Each mobile unit 232, 234, 236 includes a common Subscriber Identity Module (SIM) for WWAN and WLAN identification usage and accommodating cross-referencing of billing information. A packet control unit 238 serving as a GPRS Support Node (SGSN) 240 and a gateway GPRS Support Node (GGSN) 208 provide the support for GPRS communication on a standard GSM network.

A portable dual mode Radio 242 enables a user to conduct communications via the network 200 with the WLAN 201 via the access point 202 or the WWAN 200 via any of the antennas 226, 228, 230 according to strength of signal measurements. The dual mode Radio device 242 may be also adapted to communicate with Blue Tooth users 244.

A brief overview of GSM operations and processing mobile originated or mobile terminating call is believed appropriate as background for implementing Seamless Vertical Roaming (SVR). Next, a dual mode Radio terminal will be described along with the seamless vertical roaming interface used in the GSM/GPRS before describing Seamless Vertical Roaming.

FIG. 3 describes logical channel types 300, which carry signaling data or a user data on to a physical channel for delivery to a terminal. GSM distinguishes between traffic channels 302, which are reserved for user data and control data 304, which are used for a network management messages and some channel maintenance tasks. The logical channels transfer data and signaling at two different data rates i.e. 22.8 kb/s (Full Rate) and 11.4 kb/s (Half Rate). A Traffic Channel/Full Rate (TCHFS) 306 is a channel currently transmitting speech at a net speech rate of 22.8 kb/s. Channels 306 is divided into traffic channels, 9.6, (308); traffic channel 4.8, (310) and traffic channel 2.4, (312). A traffic channel/half rate speech (TCH/HS) 314 provides speech rate of 11.4 kb/s. The channel 314 is further divided into traffic channel H 4.8, (316) and traffic channel TCH/H2.4, (318). Typically, GSM uses two 25-MHZ frequency bands in the 900 MHz range. The mobile station transmits in the 890 to 915 MHz frequency range and the base station transmits in the 930-960 MHz range, the end point for the physical layer or the mobile station in the base transceiver station. The mobile station transmission to the BTS station is referred to as the uplink and the BTS transmission to the mobile station is referred to as the downlink.

The control channels are of four different classes: (1) broadcast channels (320); common control channels (322); dedicated control channels (324) and associated control panels (326).

The broadcast channels further comprise a Synchronization Channel (SCH) 326, which supplies the mobile station with the key training sequence needed to modulate the information coming from the base station. The SCH is mapped on to the synchronization burst. A Frequency Correction Channel (FCCH) provides the mobile station with the frequency reference of the system. The FCCH channel is mapped onto the frequency correction burst. A Broadcast Control Channel (BCCH) 330 informs the mobile station about specific system parameters needed to identify the network or to gain access to the network. These parameters include, among others, the Location Area Code (LAC), the Mobile Network Code (MNC), the information in which frequencies and neighboring cells may be found; different cell options and access parameters.

The common control channels 322 support the establishment of a dedicated link between a mobile station and a base station. The channels perform the call setup and can originate from the network or mobile. The common control channel 322 is divided into a Paging Channel, (PCH) 332 for base station calls to individual mobile stations within its cell area. An Access Grant Channel (AGCH) 334 provides information to the base station on which dedicated channel the mobile should use for immediate needs. A Random Access Channel (RACH) 336 is used by the mobile station to request a dedicated channel from a network. A message in channel 334 is a response from a base station to a mobile's rush message 336.

Dedicated control channels 324 are used for the message transfer between the network and the mobile station. They are used for low level signaling messages between the Radios. The dedicated control panels include a Standalone Dedicated Control Channel (SDCCH) 338 and a full rate traffic channel and a second standalone dedicated control channel 340 operating in the traffic channel half-rate 316. The standalone dedicated control channels transfer signaling information between a mobile station and a base station. The channels 338 and 340 are also intended for authentication and call setup.

The associated control Channels include a Fast Associated Control Channel 342 operating at a full traffic rate and a fast associated control Channel/8 344 operating at the half-rate. The associated control channels 326 further include a Slow Associated Control Channel (SACCH) 346 operating at the full rate; a slow associated control channel 4 348 operating at the 4.8 transmission data rate; a slow associate control channel 350 operating at the half data rate channel and a slow associated control channel 352 operating at 8 kb/s. The channels 346, 348, 350, 352 are associated with either a traffic channel or a standalone-dedicated channel. The purpose of the SACCH channel is channel maintenance. The SACCH carries control and measuring parameters or routine data to maintain a link between a mobile and a base station.

Figure 4:
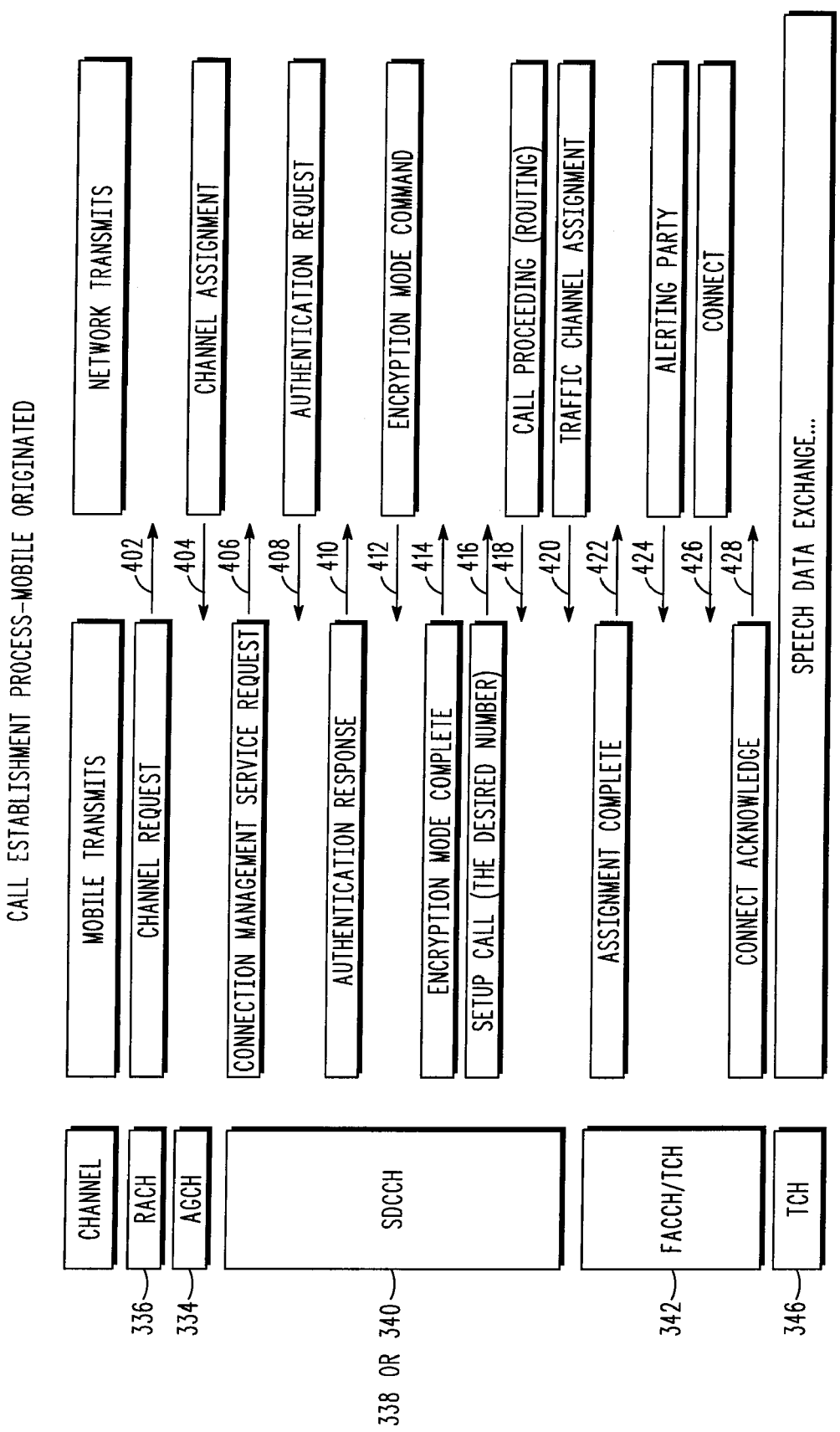
FIG. 4 is a representation of a call establishment process originated by a mobile device in the network of FIG. 2.

FIG. 4 describes a mobile originated call process 400 for establishing call to another user or terminal within the network. A mobile unit posts a request to the network in Step 402, via the RACH Channel 336. The network provides a channel assignment in Step 404, via the AGCH channel 334, which provides the parameters for access to dedicated channels for call setup. A connection management service request to the network is initiated in Step 406, via a dedicated control channel 338 or 340. In Step 408, the Authentication Center 218 (FIG. 2), provides an authentication request to the mobile over the dedicated channel. Typically, the authentication is based on private key cryptographic techniques in which a secret key known as a shared secret data is shared between the mobile station and the Authentication Center (AC). Authentication protocols are described in the EIA/TIA Telecommunications System Bulletin (TSB) 51. The mobile in Step 410 initiates an authentication response over the dedicated channel to the network. The response executes a cellular authentication and voice encryption algorithm using the Service Set Identifier (SSID); Electronic Serial Number (ESN), Mobile Identity Number (MIN) and a random number obtained from the PCs service provider. The algorithm produces a registration authentication result, which is provided to the personal service provider and includes the registration authentication results; ESN; MIN; the most significant eight bytes of a random number, and a count value that is the count of the most significant events such as registration, call origination, call determination initiated by the mobile station. The personal service provider forwards the authentication request to the Authentication Center which enters into an encryption mode command in Step 412. The encryption mode is forwarded to the mobile for completion and returned to the network in Step 414. The standard call setup is initiated by the mobile in Step 416. The setup message indicates the type of service required, user number it would like to reach and identification of the mobile and capability. The network starts a routing process in Step 418 to connect the addressed user to the calling party. In the meantime, the network assigns a traffic channel for the transmission of user data in Step 420. The assignment command from the network is answered by an assignment complete message from the mobile in Step 422, which is already on the new channel FACCH/TCH 342. The network initiates signaling to alert the called party in Step 424 and transmits an alert message to the mobile station. The mobile station generates an audible ring-back tone to tell its user that the other party has been reached and is being alerted. Where the called party is available and accepts the call, a connect message is sent to the mobile in Step 426, via the associated control channel 342. An acknowledgement is provided by the mobile to the network in Step 428 and speech/data is exchanged between the mobile and the called party over the traffic channel 306. To disconnect, the network will initiate a call release procedure by sending a disconnect message. This message will be followed by a release message from the mobile station. The network acknowledges this with a release complete message. A transmission of a channel release message terminates the physical connection and the physical Radio link terminates.

Figure 5:
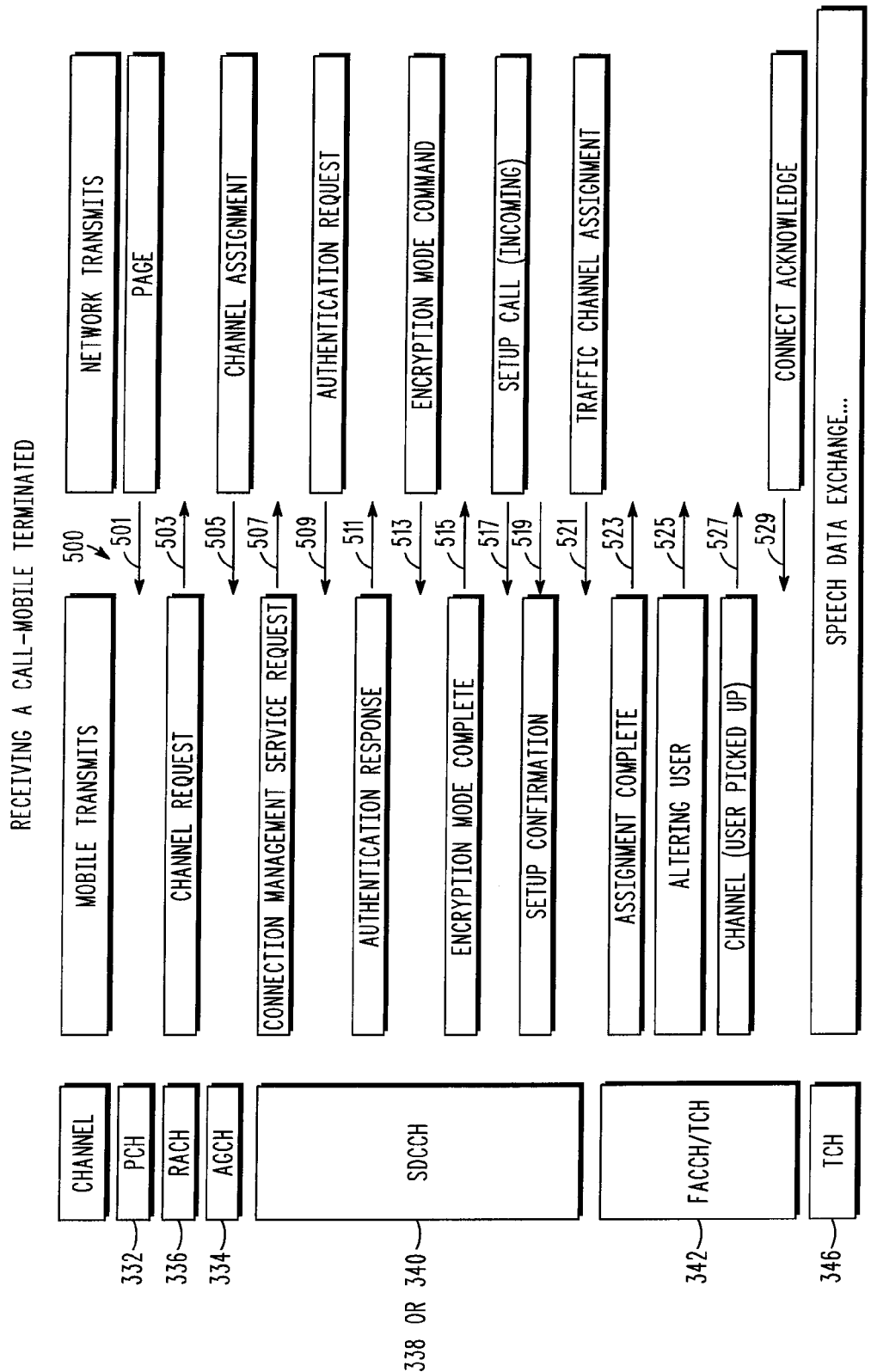
FIG. 5 is a representation of a mobile device receiving a call in the network FIG. 2.

FIG. 5 describes a mobile terminated call process 500. In Step 501, the network transmits a paging call over the common control channel PCH 332. The mobile initiates a channel request in Step 501 using the random access channel 336. The network responds with a channel assignment in 505 using the common control channel AGCH 304, which provides parameters for access to the dedicated channel for call setup. The mobile initiates connection management services from the network in Step 507 via the standalone dedicated channel 338. An authentication request is initiated by the network in Step 509 via the dedicated control channel 338 or 340. An authentication response is initiated by the mobile in Step 511 as described in Step 410. An encryption mode command is initiated by the network in Step 513. When the mobile completes the encryption mode in Step 515, an incoming setup call is provided by the network to the mobile in Step 517. A setup confirmation request is provided to the network in Step 519 and a traffic channel assignment is made by the network in Step 521. An assignment complete message is sent to the network by the mobile in Step 523 and the caller or user is alerted by the mobile in Step 525. When the caller responds, the mobile sends a connect message to the user in Step 527 and after an acknowledgment by the network in behalf of the user in Step 529, a speech data interchange is conducted over the traffic channel 306. Call termination proceeds as described for FIG. 4.

Additional details of the WWAN calling process are described in the text, "*An Introduction to GSM*" by S. M. Reddel, Artech House, Inc., Norwood, Mass., published 1995 (ISBN 0-89006-785-6), Chapters 3 and 5, and is fully incorporated herein by reference.

Figure 6:
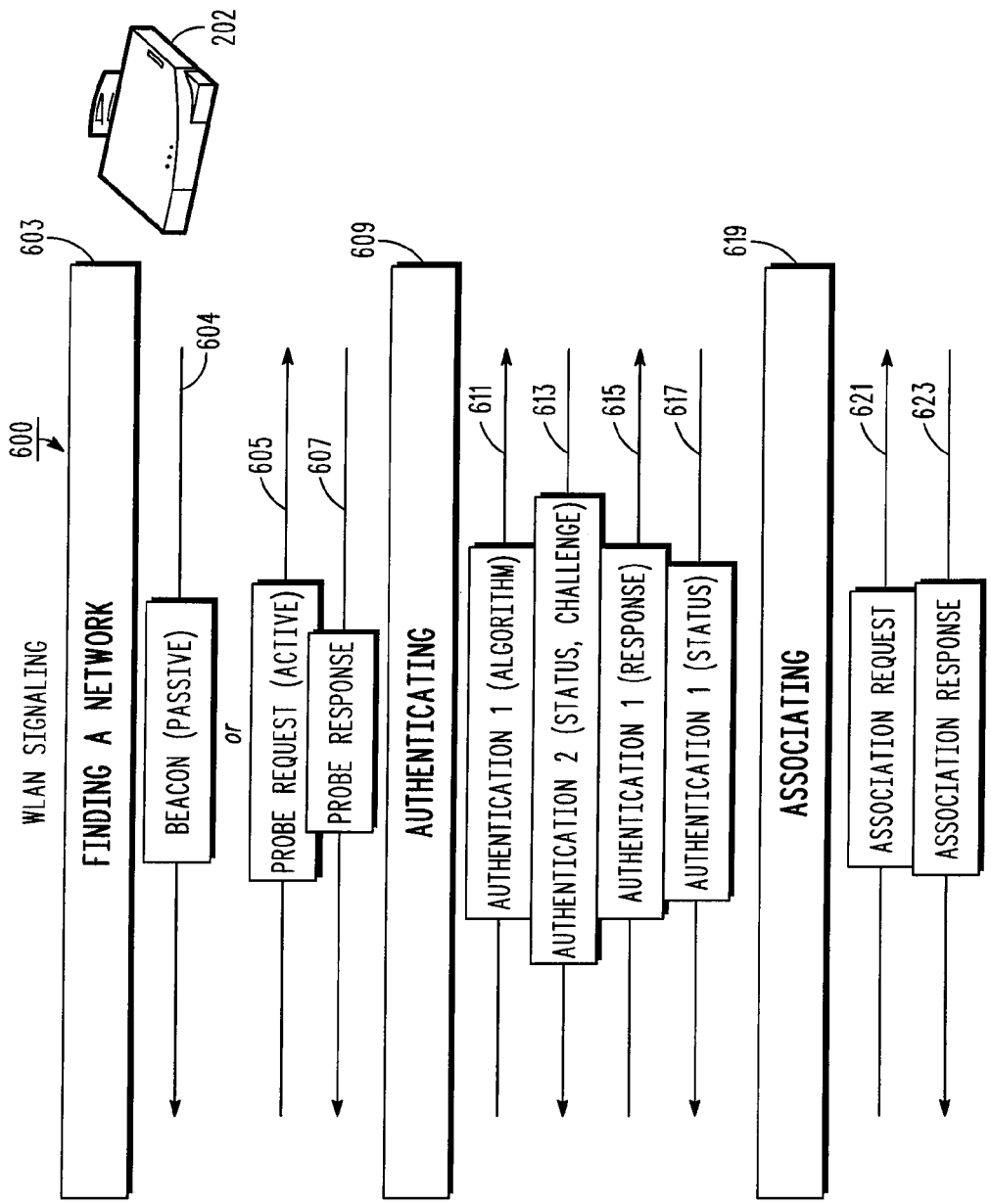
FIG. 6 is a representation of WLAN signaling states in carrying out SVR in FIG. 2.

FIG. 6 describes a signaling process 600 for connecting a mobile station 602 to an access point 202. The mobile unit 602 finds an 802.11(b) network in Step 603 having regularly scheduled beacons sent out by the AP or another mobile or an Independent Basic Service Set (IBSS) network. In Step 604, the mobile finds a network by passively listening for regularly scheduled beacons. The AP regularly transmits beacons at Targeted Beacon Transmission Times (TBTT), which are typically set between 100 to 200 ms. The beacons announce identity and location information that the mobile will need to locate a network. The mobile tunes to an 802.11(b) channel and listens for a beacon frame having a Service Set Identifier (SSID) with which the station wishes to join. After the mobile unit detects the beacon, the mobile can begin negotiating a connection by proceeding with authentication and association process as will be described hereinafter. Alternatively, in Step 605, the mobile may initiate active scanning, which involves a transmission of a probe request including an SSID of the network that the station wishes to join. The probe request is scheduled during unused GSM time slots. The probe request does not need to be synchronized to access beacon points. Since probe responses in Step 607 can be fairly long [approximately seven GSM time slots at one MBPS 802.11(b) data rates], the system may need to schedule the probe request so that the respective probe response can be captured near one long idle frame of a GSM/GPRS twenty-six multi-frame.

Once the mobile probe request is received by a network with which the mobile wishes to join, the access point transmits a probe response containing specific parameters about the network, for example, parameter sets for frequency hopping and an indirect sequence physical layers, after which an authentication process 609 is activated for the mobile unit and access point.

In Step 611, the mobile unit initiates IEEE 802.11 authentication process, which may be either an open system or shared key authentication. In the open system process, the station wishing to authenticate with another station, sends an authentication management frame containing the sending station's identity. The receiving station then sends back a frame alerting whether it recognizes the identity of the authentication station. Alternatively, the shared key authentication process may be initiated where the mobile station has received a shared key through a secure channel independent from the 802.11 network. In either case, the access point responds with a status and challenge to the mobile station in Step 613. The mobile station provides an authentication response to the access point in Step 617 and, if accepted, by the access point, an authentication status is transmitted to the mobile unit by the access point in Step 617 and, if the accepted authentication response is accepted, an associating process 619 is entered, otherwise, the access point denies the mobile station entry into the network.

Once the mobile completes the authentication process and is accepted, the mobile is ready to associate with the access point. To associate, the mobile sends an association request command in Step 621. The command allows the mobile to request services of the WWLAN, such as power saving, data queuing and AP to AP roaming within an infrastructure Base Station System (BSS). The request is acknowledged by the AP in Step 623, via an associated response frame, after which the mobile station is connected to the network for establishing and receiving calls according to the processes described in FIGS. 4 and 5.

Figure 7:
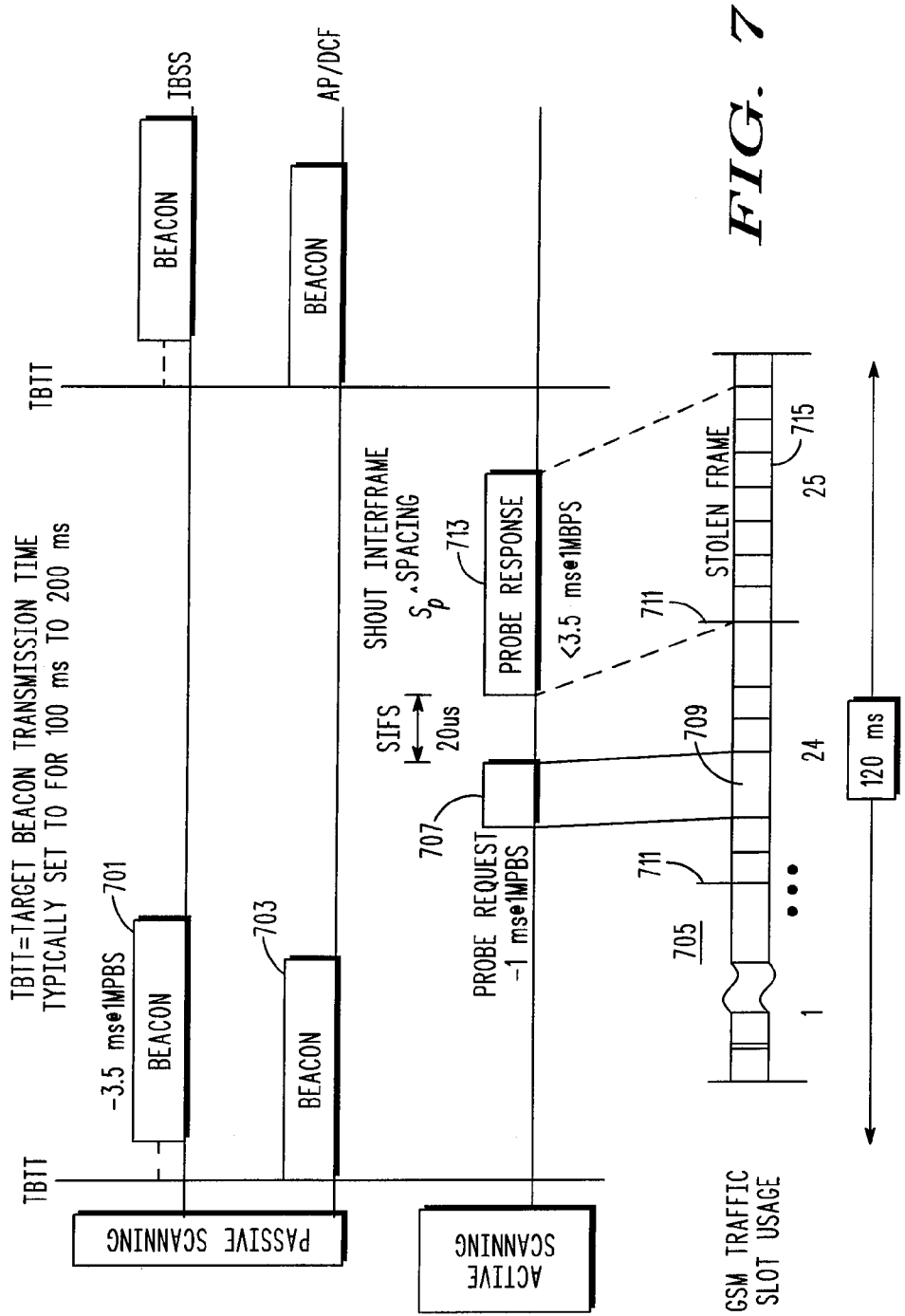
FIG. 7 is a representation of interleaving WLAN signaling with GSM traffic shown in FIGS. 4 and 5.

FIG. 7 describes interleaving WLAN signaling into vacant GSM/GPRS traffic slots for passive or active scanning. There are a total of 125 frequency channels, each 200 kHz in bandwidth in both the uplink and downlink path. A control multi-frame channel consists of 51 frames lasting 235.4 mil. sec. A traffic multi-frame consists of 26 frames lasting 120 ms. Each GSM/GPRS frame consist of eight time slots with a total duration of 6.415 ms. Each slot carries 156.25 bytes and each byte duration is 3.69 ms.

For passive scanning, the mobile station listens for regularly scheduled beacons 701 by an Independent Basic Service Set network (IBSS) where the beacons have a TBTT of 100 to 200 ms and a beacon pulse of approximately 3.5 ms duration at 1 million bytes per second (MBPS). The mobile station may also passively scan for beacons 703 sent out by Access Point (AP) performing a Data Communication Function (DCF).

The mobile station may also perform active scanning during a GSM multi frame 705 by sending out a probe request 707 during vacant traffic slots 709 in a frame 711 where the probe request is about 1 ms in length and occurs at 1 MBPS. An accepting network or access point sends a probe response 713 which usually occurs in a stolen frame 715, typically an idle frame 715 in the GSM multiframe 705. The probe response is fairly long, typically 7 GSM time slots at 1 MBPS and is separated from the probe request 707 by a short interference spacing (SIFS) of 20 microseconds.

Figure 8:
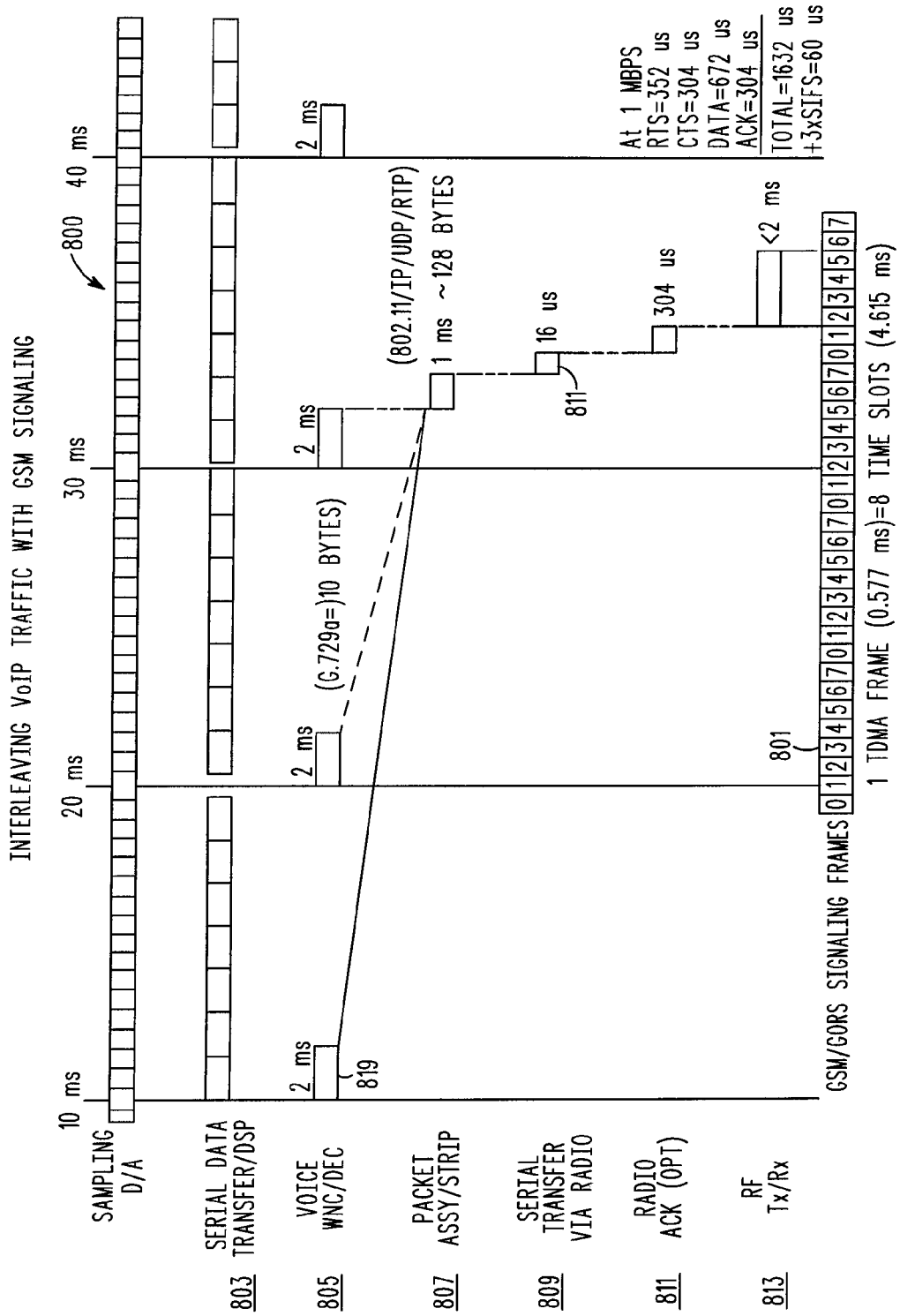
FIG. 8 is a representation of interleaving Voice Over IP (VoIP) or data traffic with GSM signaling shown in FIGS. 4 and 5.

In FIG. 8, a process 800 is described for interleaving voice or streaming data packets within vacant slots in GSM/GPRS signaling frames 801. In Step 803, a digital signal processor collects and compresses voice/data samples from a sixteen-bit A/D converter (not shown) every ten ms in Step 805. The process may include digital companding from sixteen to eight bits. A voice compression algorithm, typically the ITU compression algorithm G.729A, generates packets 809 every 2 ms and produces ten bytes for every ten ms. of voice/data samples. Three such blocks of ten bytes are collected and assembled into an 802.11b frame for a transport to a higher layer protocols, which include internet working protocol (IP), user datagram protocol (UDP) and real time protocol (RTP) encapsulation. The packet assembly process takes about one ms. in Step 807 and produces about 128 bytes. Such a packet takes less than two ms. to transmit at the lowest 802.11b data rate. Once the network request that the packet be sent, the mobile begins competition for the media and network access via standard Carrier Sensed Mobile Access (CSMA). Once the mobile determines that the media has been available for a time period equal to a Distributed Inter Frame spacing (DIF), typically twenty seconds, serial data transfer is achieved in Step 809, which takes about sixteen microseconds after which acknowledgement occurs in Step 811, which takes about 304 microsec. In Step 813, the total transmit/receive process occurs in less than two ms. and the packets 809 are fitted into unused time slots in the signaling frame 801. The interleave process 800 at 1 MBPS, includes a Request To Send (RTS) of 352 microsecs. a Clear To Send (CTS) of 304 microsecs; a data transfer of 672 microsec. and an acknowledgement (ACK) of 304 microsec. requires 1692 microsec for a total of 1692 microsec. including three Short Interframe Spacings (SIF) of 60 microsec.

Figure 9:
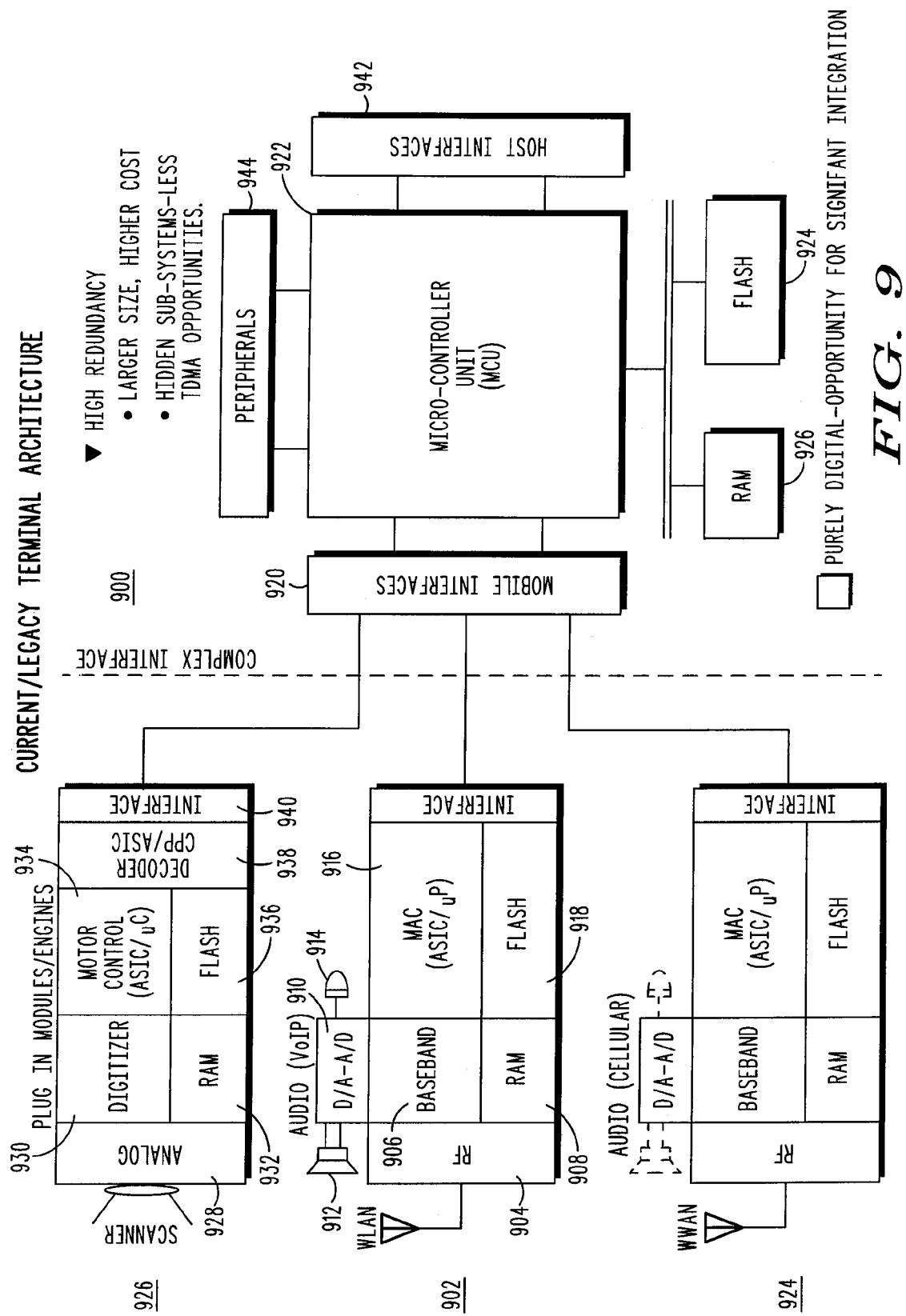
FIG. 9 is a representation of a dual mode Radio for use by a user in the network of FIG. 2.

FIG. 9 describes a dual mode Radio 900, which enables a user to seamlessly switch between a WLAN and a WWAN or vice-versa while roaming in either network area. The Radio 900 essentially consists of two Radio systems in parallel. A WLAN Radio section 902 comprises an RF section 904 including a base band signal digitization section 906 linked to a RAM 908 and a digital to analog converter 910 providing Voice over Internet Protocol output 912 and also serving as a microphone 914. The base band digitization is linked to a Medium Access Controller (MAC) supported by flash memory 918 for message control and connected to a host controller 922 via interface 920. The host serves as the system master and controls all system level actions required by the Radios. For example, the controller 922 manages the flow of control signaling and data traffic between the controller 922 and either the WLAN or WWAN Radio subsystems. The controller 922 is supported by flash memory 924 and RAM 926 in performing system control of the Radios. The controller 922 connects to external peripherals 944, e.g. printer, fax and via an interface 942 to a host, e.g. a laptop or desktop device.

A WWAN Radio 924 duplicates the WLAN Radio and a description thereof would be redundant. The WWAN radio provides cellular audio for communications between the user, and a called party and the user and a calling party.

A scanner 926 is included in the dual mode 900 for purposes of passive or active scanning, which allows a user to automatically skip across selected frequencies for purposes of obtaining a channel for transmission. The scanner comprises an analog unit 928 for receiving the channel frequency, which is digitized by a digitizer 930 supported by RAM for operating a motor control for changing the scanning frequency. The motor control is supported by flash memory 936 and provides output through a decoder 938 and interface to the processor 922.

Figure 10:
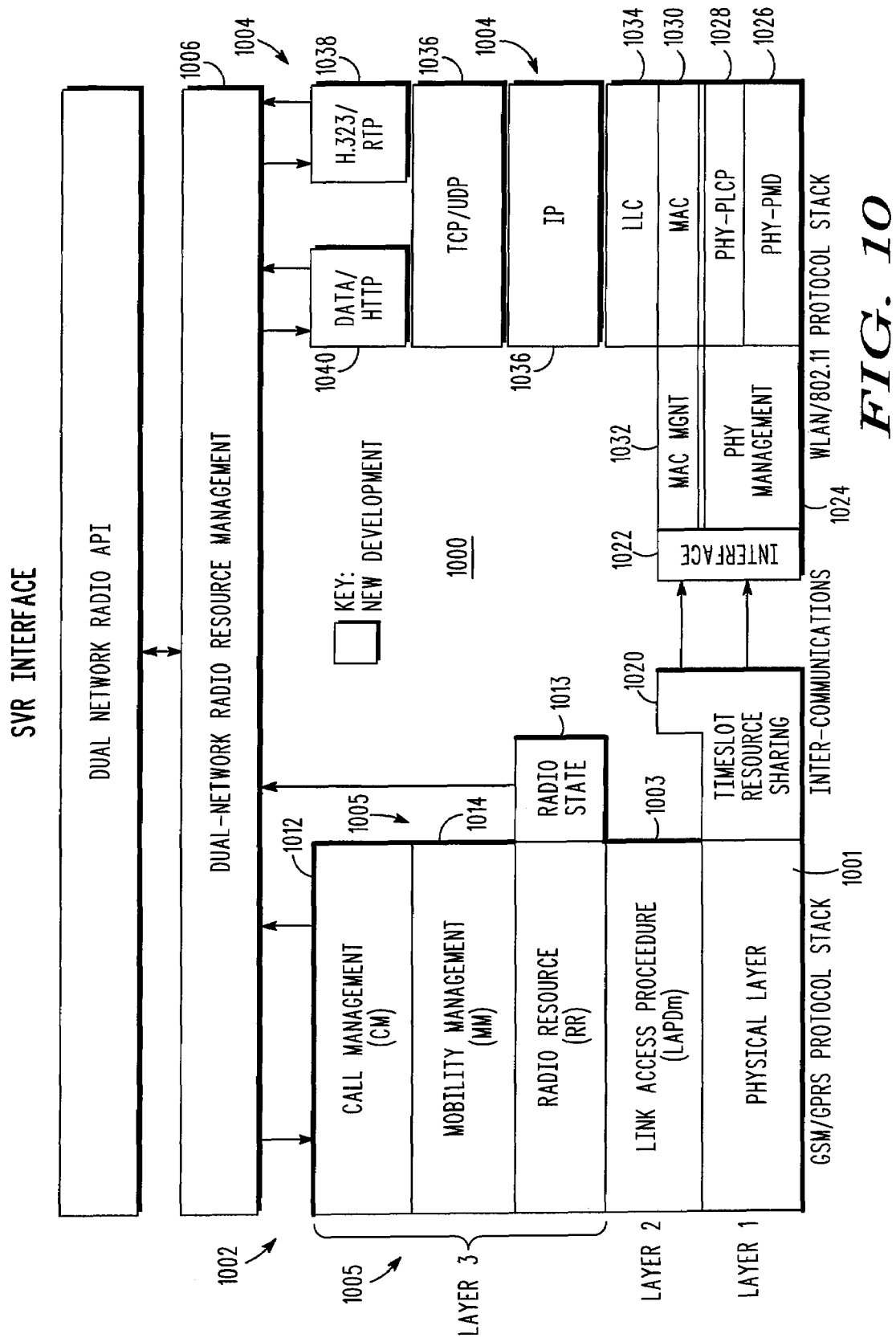
FIG. 10 is a representation of a layered SVR interface for a GSM/GPRS network and a WLAN network implementing IEEE 802.11 in accordance with the principles of the present invention.

In FIG. 10, an SVR interface 1000 in the GSN/GPRS network and the WLAN network coordinates the Radio resources based on GSM/GPRSs time slot allocations. A dual network Radio resource management function 1006 interfaces with GSM/GPRS protocol stacks 1002, 1004 and a dual mode Radio Application Program Interface (API) 1007. The management unit 1006 contains vacant GSM time slot information from GSM/GPRS layer one software 1001 A time slot and Voice Activity Detector (VAD) 1020 is added to the physical layer 1011 and reports instances and duration of time slots relative to the system clock. This information allows the management unit 1006 to optimally schedule delivery of WLAN and VoIP packets. The management unit 1006 also informs a WLAN 802.11 MAC layer 1030 to fragment long packets or to scale up to data rate such that the WLAN packets will fit within the empty GSM time slots. Since channel organization is dependent on the network and can change in real time, the VAD and time slot monitor cannot necessarily predict available time slots beyond a few tens of a ms.

The GSM/GPRS and WLAN protocol stacks 1002 and 1004 are written as three interacting higher archival layers. A layer one 1001 is optimized for the specific hardware platform. Layers two 1003 and three 1005 are fairly generic and are portable to most operating system. The layer one process 1001 is responsible for assembling and disassembling the various types of GSM burst. Each burst is constructed with the same number of bytes to perfectly fit into each time slot. The layer two process 1003 facilitates delivery and network commands across an air interface. A corresponding layer three protocol 1005 provides subroutines on either side of the channel.

The layer two process 1003 facilitates delivery of network commands across an air interface to the corresponding layer three protocol subroutines on either side of the channel. Voice and data traffic do not move through layers two or three. These layers are used only to establish; authorize; secure network connection, and to finally establish a traffic channel to which voice samples of layer one are to be transported.

The layer three process 1005 is responsible for managing Radio resources, authenticating mobile access across networks and managing details of establishing and maintaining a call. There are three sub layers within layer three that are responsible for these functions. A Radio resource function 1010 is responsible for maintaining a clear channel between the network and the mobile. The sublayer 1010 is further responsible for reacting to changing Radio environments, power level control, time alignment, cell handover and channel assignment. A Call Management sublayer (CM) 1014 is responsible for establishing, maintaining and releasing all circuits, and is blind to the mobility of the user. The Call Management layer normally communicates directly with the terminal application layers. There are routines within the CM sublayer to cope with providing supplementary services. Among the routines within the CM sublayer are specific procedures for call establishment for a mobile originating calls; call establishment procedures for mobile terminating calls, and maintaining and managing the setup of supplementary services such as call-waiting, conference calling and caller I.D., which the user may be entitled.

A Mobility Management sublayer (MM) 1014 copes with all the effects of handling a mobile user that are not directly related to Radio functions. These functions include support of user mobility, registration and management of mobility data; provision of an MM connection based on an existing RR connection to the CM sublayer and other functions relating to user confidentiality, security; verifying of the users provision to receive the services.

The GSM/GPRS stack 1002 is linked to the WLAN/802.11 protocol stack 1004, via a time slot resource sharing function 1020, which is coupled to the physical layer 1 in stack 1002 and linked to an interface 1022 in the stack 1004.

The stack 1004 implements the IEEE 802.11 standard as described in the text "Wireless LANs-Implementing Interoperable Network" by Jay Geier, published by MacMillian Technical Publishing, International Standard Book No. 1-578870-081-7, 1999, Chapters 4 and 5, and is fully incorporated herein by reference. Briefly, layer one comprises a physical management routine 1024 for a physical medium sublayer 1026, which performs the actual transmission and reception of data under the direction of a physical layer convergence procedure 1028, which communicates with a MAC layer 1030 for instructions in preparing data units for transmission. Sublayer 1028 also delivers incoming frames from the wireless layer to the MAC layer. In the MAC layer 1030, shared devices connected to the physical layer are under the direction of a MAC management routine 1032. A logical link control error 1034 provides unacknowledged connectionless service; connection oriented service and acknowledged connectionless service between a source station and a corresponding link on a destination station. The layer 1034 interfaces with an internet protocol layer 1036, which oversees the transfer of data or delivery of data using Transaction Control Protocol (TCP) and User Datagram Protocol (UDP). A TCP/UDP layer 1036 provides voice packets and/or data packets encapsulated within a Real Time Protocol (RTP) 1038. The RTP packets are prepared for transmission over an IP based network by first adding eight bytes of an User Datagram Protocol (UDP) information, which provides efficient end-to-end but unreliable real time transport of voice data packet. An ITU standard H.323 provides negotiations between network entities for data rate transmission and other functions. Voice and/or data packets may also be exchanged between the stack 1004 and the management unit using an HTTP layer 1040.

Figure 11:
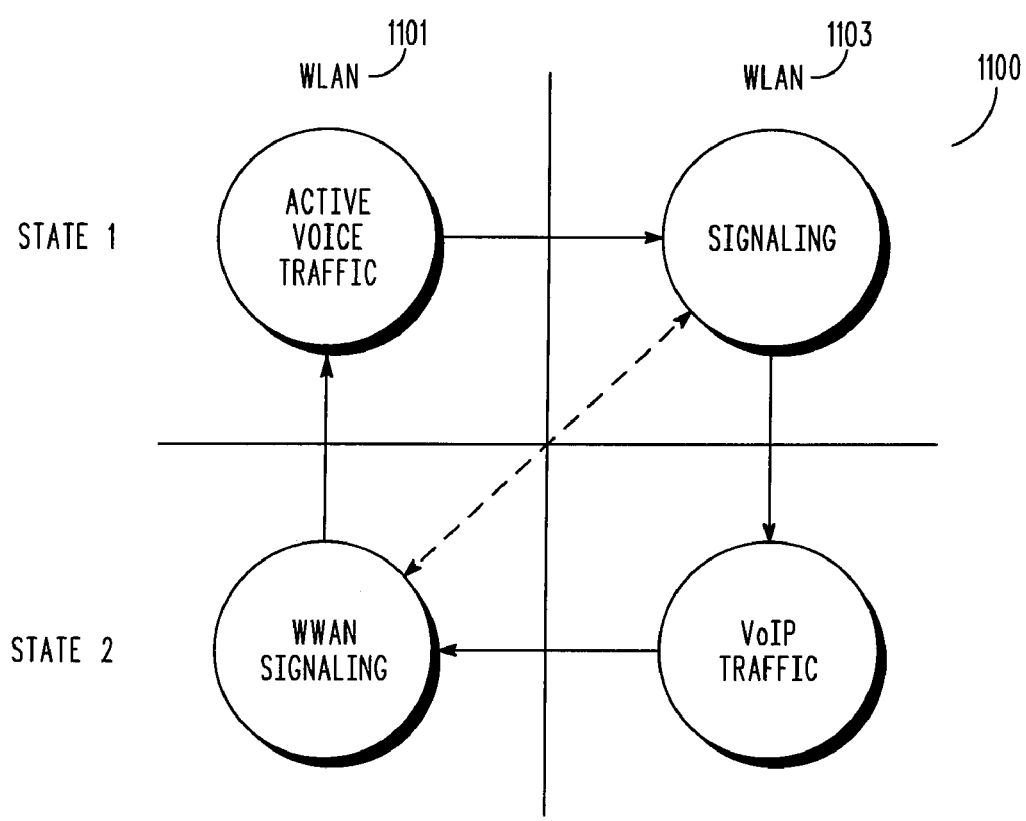
FIG. 11 is a representation of the condition for SVR between WWANs and WLANs in the network of FIG. 2 using the principles of the present invention.

FIG. 11 illustrates the overall processes 1100 for seamless active voice/data roaming between a WWAN 1101 and a WLAN 1103. For SVR to be accomplished, simultaneous signaling in one network must be feasible between a full traffic connection in the other network. WLAN signaling for network association and connection maintenance is accomplished during the unused time slots of a GSM/GPRS voice connection. Likewise, GSM/GPRS signaling for network registration and connection maintenance is accomplished between voice and data packet transfers. Two different processing states achieve simultaneous GSM/GPRS and WLAN communications, but where the voice traffic connection and signaling processes in either network are interleaved, simultaneous voice and data traffic are not expected on both the WLAN and the GSM (WWAN). Transitions from one network to another are only possible once the signaling process is complete and the basic connection is already established on the second network.

In state one, the active voice traffic between WWAN and WLAN, signaling is enabled to occur in vacant traffic slots, as described in FIG. 7.

In state two, when no voice traffic is present, all simultaneous processes must be accomplished during unused GSM/GPRS time slots in the various GSM states, as described in FIG. 8. Thus, WLAN voice traffic will occur during the vacant GSM/GPRS signaling time slots and WLAN signaling will occur during the vacant GSM traffic time slots. GSM/GPRS signaling and traffic channels are organized differently, but each is synchronized to the basic network timing.

Figure 12:
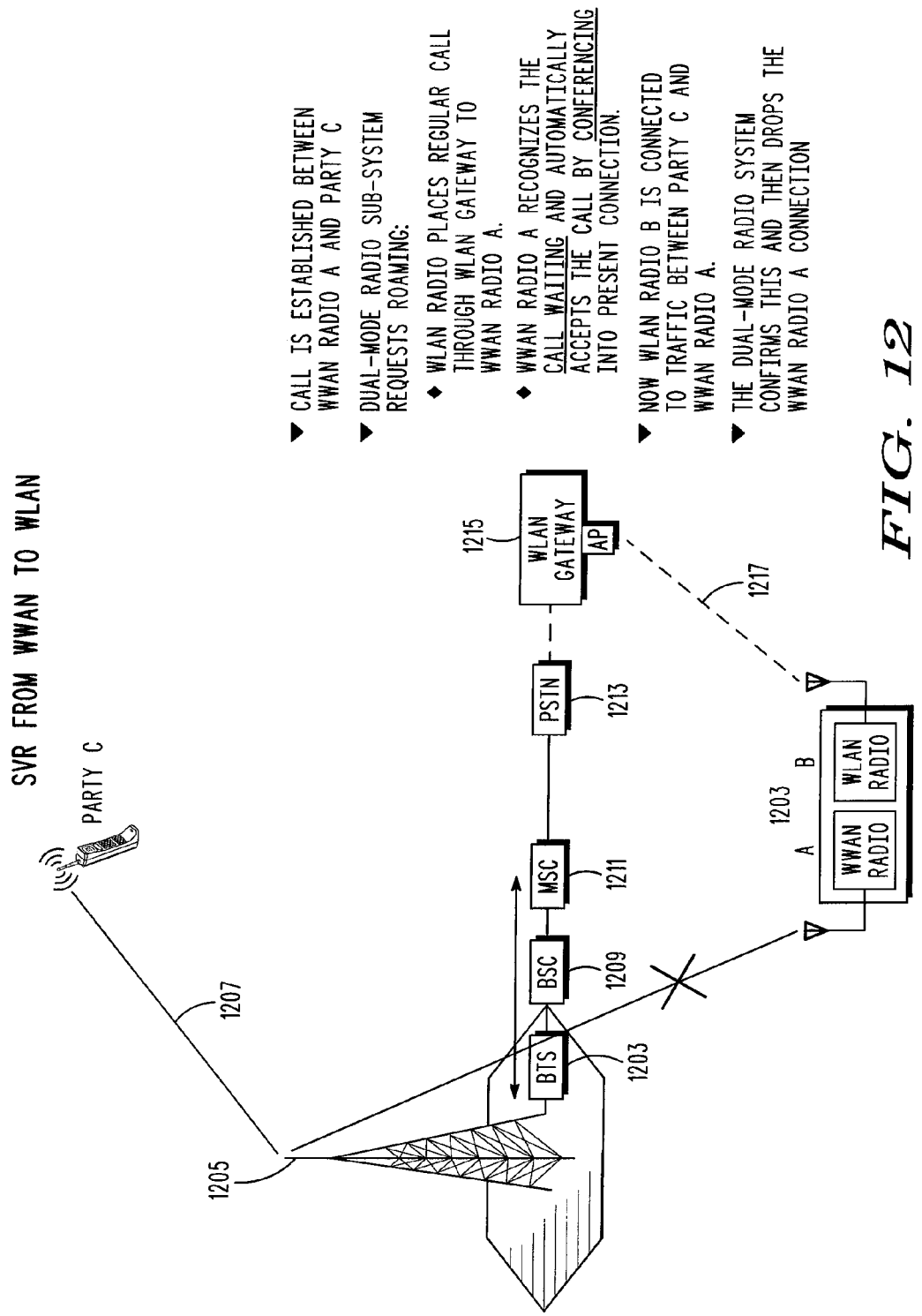
FIG. 12 is a representation of SVR from WLAN to WWAN in the network of FIG. 2.

FIG. 12 illustrates a SVR process 1200 for a WWAN WLAN roaming condition. The decision to roam from WWAN to WLAN will be based on the availability of a WLAN network and the user's preference. If the preference is to connect via WLAN, whenever possible, then the terminal will issue the SVR command as soon as the WLAN Radio sub-system associates with the network.

Roaming can begin once a WWAN voice connection is in progress and a WLAN network association has already been established. A WLAN signaling and network association must be achievable during a voice traffic WWAN session.

Roaming is implemented when a user is conversing while traveling in a car that is arriving at a building with WLAN coverage. As the user continues the conversation while walking into the building, the terminal recognizes and associates with the WLAN network without interrupting the already established WWAN connection.

In FIG. 12, a process 1200 is shown for SVR from WWAN to WLAN. A dual mode Radio 1201 comprising a WWAN section (A) and WLAN section (B) is shown connected to a party C via a base transceiver station BTS 1203 in the WWAN network 1205 linked to Party C by a GSM/GPRS airlink. The transceiver is connected to a base station controller 1209, which is connected to a mobile switching center 1211. A public switch telephone network 1213 interconnects the mobile switching center 1211 with the WLAN network 1215, including a gateway and access point. The WLAN access point is linked to the WLAN Radio B by an air link 1217.

The SVR roaming process 1200 begins while the Radio A is engaged in a voice traffic connection with party C. In Step 1, An explicit call transfer (ECT) command is issued to the WWAN network so as to initiate transfer of the channel to the gateway that is hosting the WLAN Radio B. The explicit call transfer is described in "*Integrated Services Digital Network (ISND); Signaling System No. 7; ISDN User Part for the International Interface*"; Part 14: *Explicit Call Transfer (ECT) Supplementary Services*[ITU-T Recommendation Q.372, clause 7 (1996), modified, ["Version 3.1.3, 1998."]. Radio A will always know how to reach Radio B because it can access the same information during the WLAN association process. Whether or not Radio A originated or accepted the call has no bearing on the procedure.

In Step 2, upon receiving the ECT command, the WWAN checks whether or not the gateway connected to Radio B is registered to the WWAN network and is answering the call. While this occurs, the connection between Radio A and party C is interrupted and will continue if the ECT fails.

In Step 3, Radio B verifies the caller identification is from Radio A and immediately signals the gateway to accept the call. The WWAN receives confirmation that the gateway signaled acceptance of the call.

In Step 4, the network issues signaling confirmation to Radio A that it is transferring the call and dropping the Radio A connection. At this point, the access point begins to queue voice samples for the VoIP vocoder while it awaits the establishment of the second connection.

In Step 5, Radio A issues an acknowledgment to the network and issues a "network disconnect" command before dropping back into the idle state. In this state, the WWAN Radio roams and remains synchronized to a broadcast channel (BCH) while monitoring for a WWAN page over the associated paging channels (PCH). The network does not require vocoder function in order to accommodate WWAN network signals.

In Step 6, Radio B awaits connection to party C via the gateway. Once the connection is established, the access point releases the queued VoIP/data packets.

Figure 13:
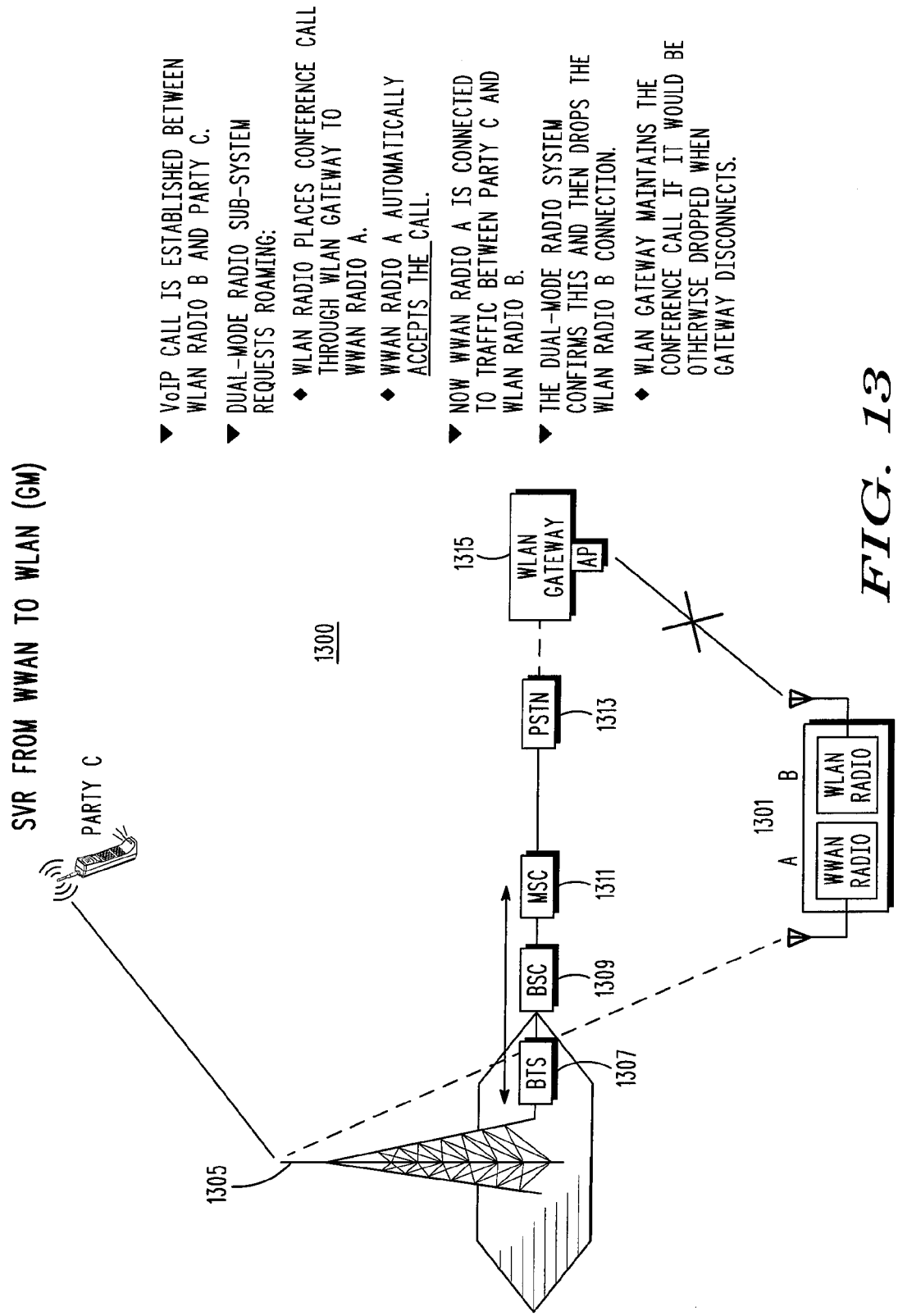
FIG. 13 is a representation of SVR from WWAN to WLAN in the network of FIG. 2.

In FIG. 13, a process 1300 is shown for SVR from WLAN to WWAN. The decision to roam from WLAN to WWAN will be based on the availability of a WWAN network. If the user prefers to connect via a WLAN connection whenever possible, then the terminal 1301 will roam to a WWAN network only when absolutely necessary. When the terminal 1301 senses a gradual transition to high WLAN packet error rates, frequent rates scale back or a consistent signal strength degradation, then the terminal will issue an SVR (WWAN) command as soon as the WWAN Radio sub-system A registers to the WWAN network and indicates idle status. Adequate Hysterisis and the noise threshold will prevent frequent switching between the WWAN and the WLAN networks when the terminal 1301 is located between the boundaries of the WLAN network.

Before roaming begins, the system verifies that a WLAN voice connection is in progress and that the WWAN Radio is idle and monitoring for WWAN network paging. This requires that WWAN signaling and network registration must be achievable during a WLAN VoIP connection. For example, while the user is conversing, via voice over IP while leaving a building with almost no WWAN coverage, the WWAN Radio will need to find the network and register before the call can be switched over. The switching must occur during the WWAN VoIP connection without significant disruption of the VoIP quality and as a result, the WWAN signaling must be time multiplexed into the WLAN connection.

Assuming that the WWAN network process is complete and that the WWAN Radio is in an idle mode monitoring for a page, the terminal will issue an SVR (WWAN) command to the dual mode Radio sub-system in Step 1.

In Step 2, while the Radio B sub-system is engaged in a voice traffic connection via the gateway with party C, the terminal 1301 request that the gateway 1315 play an ECT command to the network 1305. The command will initiate transfer of the traffic channel to Radio A. Radio B will always know how to reach Radio A, since the system can access the WWAN number from the Subscriber Identification Module Card. Whether or not Radio B originated or accepted the call, via the gateway, has no bearing on the process.

In Step 3, upon receiving the ECT command, the WWAN network checks whether or not Radio A is registered to the network and is answering the call. While this occurs, the connection between Radio B and party C is not interrupted.

In Step 4, Radio A verifies the caller identification originated from Radio B and immediately signal acceptance of the call. The network receives confirmation that Radio A accepted the call.

In Step 5, the network issues signaling confirmation to the gateway that is transferring the call and dropping the connection. The gateway informs the mobile that it will begin to queue samples and switch to the WWAN vocoder.

In Step 6, the gateway issues an acknowledgement to the WWAN network and Radio B drops back into a power saving state. In the low power state, Radio B will continue to monitor the airways for access point beacons and other network activity. For example, probe responses, requests to send, so as to keep track of available WLAN networks and to report their presence to the SVR software drivers.

In Step 7, once Radio A is connected to party C, the access point will release queued voice packets to the transmitter.

While the invention has been described in terms of GSM/GPRS and 802.11 environment, the invention has application to GSM and PSTN/SS7 circuit switch networks. Moreover, the transport of voice packets between the mobile and an access point/EGC of an 802.11 WLAN as VoIP, the remaining connection between EGC and the PSTN will transition via a gateway to a circuit switch connection. In effect, calls are being switched between two PSTN interfaces using standard SS7 signaling protocols. Only the last meters to the mobile are actually wireless and incorporate either random packets 802.11 for a fixed time slots (GSM/GPRS).

Although explicit call transfer ECT has been described, conference calling may be substituted for ECT. While conference calling provides seamless transition, some PSTN/SS7 networks will not necessarily maintain a connection to the remote party after the originator drops the call, unless every one on the call is paying the conference rate. Conference calling does not require buffering of voice packets while ECT requires buffering because no voice packets are transferred once ECT has begun to execute. The network maintains the active connection until the called party picks up so that there is no risk of dropping the call.

In the case of processes 1200 and 1300 where more than one network is available, an application/user can switch or roam to a specific network based on knowledge of the network physical location. The physical location may be determined by an integrated GPS or Real Time Location System (RTLS). Examples of Real Time Location Systems are those using signal strength, time difference of arrival or angle of arrival estimates and triangulation methods from the very RF signals that constitute the various wireless networks. Other methods of network location include RFID and Infra-Red emitter location markers. Application Ser. No. 09/961,373, filed Sep. 25, 2001, entitled "Three-Dimensional (3-D) Object Locator System, Using an Intuitive Sound Beacon: System and Method of Operation", assigned to the same assignee as that of the present invention and fully incorporated herein by reference describes an example of an RTLS system using angle of arrival estimates and triangulation for determining a position of an object.

When more than one network is available to a roaming user, either push-based location services or pull-based location services may be desired. For example, even though WWAN coverage with good signal strength may be available in a mall, WLAN network access with equally good or slightly worse signal quality may still be preferred because of the higher speed access and additional e-commerce services within the mall. Hence, a roaming algorithm incorporated in the dual mode Radio will take into account that the user is in the mall (or a university campus) and switch over to the WLAN, even though the signal quality is not necessarily any better.

While the invention has been shown and described in conjunction with a preferred embodiment, various changes can be made therein without departing from the spirit scope of the invention as defined in the appended claims, in which

I claim:

1. A system for automatic and seamless vertical roaming (SVR) between a wireless local area network (WLAN) and a wireless wide area network (WWAN) comprising:
   a mobile station configured to communicate WWAN and WLAN transmissions to the
   WWAN and the WLAN; and
   command apparatus configured to initiate transfer of traffic between the mobile station and
      a remote party communicated over one of the WLAN and the WWAN to the other of the WLAN and the WWAN responsive to signal degradation,
   wherein the mobile station is configured to interleave WLAN data in vacant WWAN slots.

2. The system of claim 1, wherein the command apparatus is configured to initiate transfer of traffic between the mobile station and the remote party via the WWAN to the WLAN responsive to the mobile station entering an area served by the WLAN.

3. The system of claim 1, wherein the mobile station further comprises a dual mode radio configured to communicate over the WWAN and WLAN.

4. The system of claim 1, further comprising a mobile switching center configured to provide an Explicit Call Transfer (ECT) function for SVR switching between WLAN and WWAN and vice versa.

5. The system of claim 1, wherein the mobile station is configured to interleave WLAN signaling data in vacant WWAN traffic slots.

6. The system of claim 1, wherein the mobile station is configured to interleave WLAN/WWAN voice/data traffic in vacant WWAN signaling slots.

7. The system of claim 1, wherein the mobile station further comprises an SVR interface configured to link a dual mode radio API with a WWAN protocol stack and a WLAN protocol stack.

8. The system of claim 7, wherein the SVR interface further comprises a three-layer communication interface.

9. The system of claim 1, further comprising a jitter buffer in the WLAN to transform random packet arrival times into uniformly spaced streaming data.

10. The system of claim 1, further comprising circuit switching apparatus between the WWAN and the WLAN for maintaining a connection between parties on the WWAN and the WLAN when transferring from WWAN to the WLAN and vice versa.

11. A mobile device, comprising:
   a dual mode radio configured to communicate over a wireless local area network (WLAN) connection and over a wireless wide area network (WWAN) connection; and
   a controller configured to receive traffic over the one of the WLAN connection and the WWAN connection and transition to receive traffic over the other of the WLAN connection and the WWAN connection responsive to signal degradation;
   wherein the controller is configured to interleave WLAN data in vacant WWAN slots.

12. The mobile device of claim 11, wherein the controller is configured to implement a seamless vertical roaming (SVR) interface linking a dual mode radio API with a WWAN protocol stack and a WLAN protocol stack.

13. The mobile device of claim 11, where in the controller is configured to interleave WLAN voice data in vacant WWAN signaling slots.

14. The mobile device of claim 12, wherein the controller is configured to limit a size of WLAN data packets in accordance with the available WWAN time slots.

15. The mobile device of claim 12, wherein the controller is configured to interleave WLAN signaling traffic in vacant WWAN voice/data traffic time slots.

16. The mobile device of claim 12, wherein the controller is configured to interleave WLAN voice traffic in vacant WWAN signaling traffic time slots.

17. The mobile deice of claim 11, wherein the controller is configured to interleave WWAN signaling data between WLAN packet transfers.

18. The mobile device of claim 11 further comprising a scanner coupled to the controller and configured to identify the availability of a WLAN gateway.

19. The mobile device of claim 18, where the scanner is configured to identify the availability of the WLAN gateway passively by monitoring beacon signals.

20. The mobile device of claim 18, where the scanner is configured to identify the availability of the WLAN gateway actively by sending a probe request during a first vacant WWAN time slot.

21. The mobile device of claim 19, wherein the controller is configured to direct the scanner to schedule the probe request to allow a probe response to be received by the dual mode radio over the WLAN connection during a second vacant WWAN time slot.

22. A method for automatic and seamless vertical roaming between a wireless local area network (WLAN) and a wireless wide area network (WWAN) while maintaining an active voice or data connection comprising the steps of:
    issuing a command to the WWAN by a mobile station including a dual mode radio configured for WWAN and WLAN transmission, the command initiating transfer of a voice or data call on the WWAN to a remote party on the WLAN;
    checking whether or not a gateway is linked to the dual mode radio for WLAN transmissions while maintaining the call between the remote party and the mobile station by interleaving WLAN signaling data in vacant WWAN slots;
    verifying by the dual mode radio that a caller identification is from a WWAN transmission and signaling the WLAN gateway to accept the call by interleaving WLAN signaling data in vacant WWAN slots;
    storing the packets at the mobile station while waiting for an establishment of a WLAN connection;
    dropping the WWAN transmission for the call by the WWAN; and
    connecting the caller via the gateway and releasing the stored packets to the dual mode radio for WLAN transmission.

23. A method for automatic and seamless vertical roaming between a wireless local area network (WLAN) and a wireless wide area network (WWAN) while maintaining an active voice or data connection comprising the steps of:
    issuing a command to a gateway by a mobile station including a dual mode radio configured for WWAN and WLAN transmission, the command initiating transfer of a VoIP call or data communications on the WLAN to a remote party on the WWAN;
    checking by the WWAN whether or not the dual mode radio for WWAN transmissions is registered to the WWAN while maintaining the call between the remote party the and mobile station;
    interleaving WLAN data in vacant WWAN slots;
    verifying by the dual mode radio that a caller identification is from WLAN transmission and signaling the WWAN to accept the call;
    storing the packets at the mobile station while waiting for the establishment of the WWAN connection;
    dropping the WLAN transmission for the call by the WLAN; and
    connecting the caller to the mobile station via the WWAN and releasing the stored packets to the dual mode Radio for WWAN transmissions.

24. The method of claim 22, further comprising providing an Explicit Call Transfer (ECT) function for SVR switching between WLAN/WWAN networks when a user roams in the networks.

25. The method of claim 23, further comprising providing an Explicit Call Transfer (ECT) function for SVR switching between WLAN/WWAN networks when a user roams in the networks.

26. The method of claim 22, further comprising:
    interleaving WLAN signaling data in vacant WWAN traffic slots; and
    interleaving WLAN voice/data traffic in vacant WWAN signaling slots.

27. The method of claim 23, further comprising:
    interleaving WLAN signaling data in vacant WWAN traffic slots; and
    interleaving WLAN voice/data traffic in vacant WWAN signaling slots.

28. The method of claim 22, further comprising linking a dual mode radio API with a WWAN protocol stack and a WLAN protocol stack for SVR between WWAN and WLAN and vice versa.

29. The method of claim 23, further comprising linking a dual mode radio API with a WWAN protocol stack and a WLAN protocol stack for SVR between WWAN and WLAN and vice versa.

30. The method of claim 22, further comprising transforming random packet arrival times into uniformly spaced streaming data using a jitter buffer.

31. The method of claim 23, further comprising transforming random packet arrival times into uniformly spaced streaming data using a jitter buffer.

32. The method of claim 22, further comprising maintaining a connection between parties on the WWAN and the WLAN when transferring from WWAN to the WLAN and vice versa.

33. The method of claim 23, further comprising maintaining a connection between parties on the WWAN and the WLAN when transferring from WWAN to the WLAN and vice versa.

* * * * *

UNITED STATES PATENT AND TRADEMARK OFFICE
CERTIFICATE OF CORRECTION

PATENT NO. : 7,561,547 B2
APPLICATION NO. : 11/356474
DATED : July 14, 2009
INVENTOR(S) : Bridgelall It is certified that error appears in the above-identified patent and that said Letters Patent is hereby corrected as shown below:

ON THE TITLE PAGE

On the Title Page, item (12), under "United States Patent", in Column 1, Line 2, delete "Brideglall" and insert -- Bridgelall --, therefor.

On the Title Page, item (75), under "Inventor", in Column 1, Line 1, delete "Brideglall," and insert -- Bridgelall, --, therefor.

IN THE DRAWINGS

In Fig. 7, Sheet 7 of 13, for Tag "707", Line 2, delete "-1 ms@1MPBS" and insert -- 1 ms@1MBPS --, therefor.

In Fig. 9, Sheet 9 of 13, below Tag "924", delete "SIGNIFANT" and insert -- SIGNIFICANT --, therefor.

In Fig. 10, Sheet 10 of 13, for Tag "1003", Line 1, delete "PROCEEDURE" and insert -- PROCEDURE --, therefor.

In Fig. 10, Sheet 10 of 13, for Tag "1032", Line 1, delete "MGNT" and insert -- MGMT --, therefor.

In Column 1, Line 61, insert -- (1) --, before "U.S. Pat. No. 5,682,379".

In Column 13, Line 51, delete "An" and insert -- an --, therefor.

In Column 13, Line 58, delete "["Version 3.1.3, 1998."]." and insert -- ["Version 3.1.3, 1998."]]. --, therefor.

In Column 17, Line 15, in Claim 17, delete "deice" and insert -- device --, therefor.

CERTIFICATE OF CORRECTION (continued)
U.S. Pat. No. 7,561,547 B2

In Column 18, Line 9, in Claim 23, delete "the and" and insert -- and the --, therefor.

Signed and Sealed this

Sixteenth Day of February, 2010

David J. Kappos
*Director of the United States Patent and Trademark Office*